US011943686B2

(12) United States Patent
Szemes et al.

(10) Patent No.: US 11,943,686 B2
(45) Date of Patent: Mar. 26, 2024

(54) INFORMATION TRANSMISSION SYSTEM FOR A COMMERCIAL VEHICLE AND A COMMERCIAL VEHICLE AND COMMERCIAL VEHICLE COMBINATION

(71) Applicant: KNORR-BREMSE Systeme fuer Nutzfahrzeuge GmbH, Munich (DE)

(72) Inventors: Bence Szemes, Szekszard (HU); Huba Nemeth, Budapest (HU); Tamas Konya, Paks (HU); Gabor Toereki, Erd (HU); Kristof Hillier, Gardony-Agard (HU); Benedek Pour, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 527 days.

(21) Appl. No.: 17/272,186

(22) PCT Filed: Aug. 6, 2019

(86) PCT No.: PCT/EP2019/071103
§ 371 (c)(1),
(2) Date: Feb. 26, 2021

(87) PCT Pub. No.: WO2020/043441
PCT Pub. Date: Mar. 5, 2020

(65) Prior Publication Data
US 2021/0219113 A1    Jul. 15, 2021

(30) Foreign Application Priority Data
Aug. 31, 2018   (EP) .................................... 18192100

(51) Int. Cl.
*H04B 7/14*    (2006.01)
*B60C 23/00*   (2006.01)
(Continued)

(52) U.S. Cl.
CPC ............. *H04W 4/40* (2018.02); *B60C 23/009* (2013.01); *B60C 23/0483* (2013.01); *H04B 7/155* (2013.01); *H04L 67/12* (2013.01)

(58) Field of Classification Search
CPC ....... H04W 4/40; H04B 7/155; B60C 23/009; B60C 23/0483
See application file for complete search history.

(56) References Cited

U.S. PATENT DOCUMENTS

2008/0129479 A1   6/2008  Braun et al.
2010/0019881 A1   1/2010  Shimura
(Continued)

FOREIGN PATENT DOCUMENTS

CN    101699653 A  *  4/2010
CN    101878123 A    11/2010
(Continued)

OTHER PUBLICATIONS

Japanese-language Office Action issued in Japanese Application No. 2021-510798 dated Nov. 16, 2022 with English translation (eight (8) pages).

(Continued)

*Primary Examiner* — Erika A Washington
(74) *Attorney, Agent, or Firm* — Crowell & Moring LLP

(57) ABSTRACT

An information transmission system for at least one commercial vehicle includes at least one information sending module, at least one repeating module and at least one receiving module. The information sending module is configured and arranged to send signals defining a message to the repeating module. The repeating module is configured and arranged to enhance the signals and forward the signals to the receiving module. A commercial vehicle and a commercial vehicle combination utilize the information transmission system.

13 Claims, 1 Drawing Sheet

(51) Int. Cl.
   *B60C 23/04*   (2006.01)
   *H04B 7/155*   (2006.01)
   *H04W 4/40*    (2018.01)
   *H04L 67/12*   (2022.01)

(56) References Cited

U.S. PATENT DOCUMENTS

| | | |
|---|---|---|
| 2010/0274607 A1 | 10/2010 | Carresjo et al. |
| 2016/0174258 A1 | 6/2016 | Wang et al. |
| 2016/0221403 A1* | 8/2016 | Uh .................. B60C 23/009 |
| 2016/0255420 A1* | 9/2016 | McCleland ............ G06Q 10/08 340/870.07 |
| 2017/0282654 A1 | 10/2017 | Guinart et al. |
| 2019/0023293 A1 | 1/2019 | Arashin et al. |

FOREIGN PATENT DOCUMENTS

| | | |
|---|---|---|
| CN | 107175995 A | 9/2017 |
| CN | 107276612 A | 10/2017 |
| DE | 203 20 506 U1 | 12/2004 |
| DE | 10 2006 055 878 A1 | 6/2008 |
| DE | 10 2008 032 920 A1 | 1/2010 |
| DE | 102008032920 A1 * | 1/2010 ........... B60C 23/009 |
| JP | 2003-152737 A | 5/2003 |
| JP | 2006-69231 A | 3/2006 |
| JP | 2006-272995 A | 10/2006 |
| JP | 2008-103821 A | 5/2008 |
| JP | 2009-278194 A | 11/2009 |
| WO | WO 2017/169454 A1 | 1/2019 |

OTHER PUBLICATIONS

Chinese-language Office Action issued in Chinese Application No. 201980056517.3 dated Apr. 17, 2023 with English translation (11 pages).
Japanese-language Office Action issued in Japanese Application No. 2021-510798 dated Apr. 26, 2023 with English translation (8 pages).
Japanese-language Office Action issued in Japanese Application No. 2021-510798 dated Apr. 12, 2022 with English translation (10 pages).
International Search Report (PCT/ISA/210) issued in PCT Application No. PCT/EP2019/071103 dated Oct. 8, 2019 (two (2) pages).
Written Opinion (PCT/ISA/237) issued in PCT Application No. PCT/EP2019/071103 dated Oct. 8, 2019 (six (6) pages).

* cited by examiner

INFORMATION TRANSMISSION SYSTEM FOR A COMMERCIAL VEHICLE AND A COMMERCIAL VEHICLE AND COMMERCIAL VEHICLE COMBINATION

BACKGROUND AND SUMMARY OF THE INVENTION

The present invention relates to an information transmission system for a commercial vehicle, a commercial vehicle and a commercial vehicle combination comprising at least one truck and at least two trailers.

Between the truck, trailer or multiple trailers in the field of commercial vehicles, wired communication interfaces (e.g. defined by the ISO 11992 standards) are widely used. But these wired communication lines have limited throughput that often cannot support the data rate required by the emerging applications. Moreover, these wired communication interfaces are not globally used. To support higher bandwidth and thus more functionality plus a globally applicable interface, an alternative solution is wireless communication between the tethered transportation units.

Attenuation and thus loss of wireless signals increases with distance. Therefore, by the nature of wireless communication, the quality of service drops as the distance between transceiver and receiver increases. In a road-train scenario, when multiple trailers are attached to a truck, due to this phenomenon it is extremely difficult to send data with significant data rate and low latency from the last trailer to the truck directly.

AU 2012 101 599 A4 relates to a wireless trailer brake control system for communicating braking information between a tow vehicle and a trailer using wireless communication, wherein the trailer control module is communicatively coupled to the trailer brake system of the trailer.

US 2017/021372 A1 relates to a vision system where a camera is placed onto the trailer, the camera picture is transmitted wirelessly to the towing vehicle and the camera picture is presented on a screen in the towing vehicle.

US 2015/061853 A1 relates to a repeater module used in a tire pressure monitoring system and selectively installed in a mother vehicle or daughter vehicle of a tow truck for receiving a status signal from a daughter vehicle tire pressure sensor in each daughter vehicle tire and providing a corresponding wireless signal to an on-vehicle main unit in said mother vehicle, also a TPMS element is described, which implies significantly less demanding data rate and latency requirements (usually working in the 433 MHz and 333 MHz band, meaning lower peak data rate than 20 kbps, higher latency than 1 sec.).

EP 1 384 626 A1 relates to an automobile mirror device having a repeater station accommodated therein comprising a wireless communication repeater station, which has a function of relaying a wave signal to be transmitted from inside or outside of the automobile to the inside or outside of the automobile, accommodated within a mirror device provided on the automobile.

It is an object of the present invention, to provide an information transmission system for commercial vehicles, a commercial vehicle and a commercial vehicle combinations, with improved characteristics, in particular wherein the transmission of signals is enhanced and that attenuation and thus, loss of wireless signals is avoided.

This object is achieved by an information transmission system for at least a commercial vehicle in accordance with the claimed invention. Accordingly, an information transmission system for at least one commercial vehicle is provided, comprising at least one information sending module, at least one repeating module and at least one receiving module, wherein the information sending module is configured and arranged to send signals defining a message to the repeating module, wherein the repeating module is configured and arranged to enhance the signals and forward the signals to the receiving module.

The invention is based on the basic idea that an intervehicle communication system between vehicles connected to a combination is provided, which makes it possible to enhance the range of the wireless communication and does use wireless communication between combination vehicles even in road-train scenarios. In particular, attenuation and loss of wireless signals increases with distance, which is now avoided by providing the repeating module. By repeating the wireless signals in the trailers in between and between vehicles of the road-train, the quality of service can be maintained over the complete distance from signal deployment to signal with the receiving point. So, data can be sent with a significant data rate even over a larger distance and with low latency from the last trailer to the truck directly and vice versa.

The repeating module may be a transceiver and/or or part of a transceiver. By this, for example all vehicles of the road-train may be equipped with the same transceiver. By this, identical party may be used, which may help to decrease the costs and enhance the quality to economics of scale and a larger amount of similar or identical parts being used in the system.

Also, the information sending module may be a transceiver and/or a part of a transceiver. By this, also quality may be enhanced and costs may be lowered. Furthermore, it is also possible to not only send information but also receive it.

The receiving module may be a transceiver and/or a part of a transceiver. Again, this is also helpful to use identical parts all over the road-train in the whole system.

The information sending module may be configured and arranged to be mounted on a truck and that the repeating module and the receiving module are not mounted on a truck. In particular, the sending module may be on the truck and connected to the truck information system, which is handled and controlled by the driver during operation. The repeating module may be for example on the first trailer and the receiving module on the last trailer in case of a road-train scenario. Consequently, a complete data transmission line with elements on all connected vehicles, being operated in combination, can be established.

The signal transmission between the information sending module and the repeating module may be wireless. By providing a wireless transmission of signals no wired lines must be established, which can be subject to mechanical failures.

In particular, the signal transmission between the information repeating module and the receiving module may be wireless.

The signal transmission between the sending module and/or the repeating module and/or the receiving module may be in conformity with at least one of the following standards: WiFi, Bluetooth, WAVE, ETSI ITS-G5, IEEE 802.15.4, C-V2X or the like. Choosing one of these standards allows the use of standard elements and system components. Furthermore, the quality of the overall system and also of the system transmission may be higher, as established standards may be used. Also the costs of the system or the data transmission components may be lower than by creating a separate, own standard.

The information transmission system may comprise one or more directional antenna(s) with the gain of at least +5 dBi.

The directional antenna may have a wired connection to at least one of the information sending module and/or the repeating module and/or the receiving module.

The at least one directional antenna may be provided for the information sending module and the repeating module and the receiving module. By this, each module may have a directional antenna, which is helpful for establishing and defining a reliable data transmission between the modules of the system.

Each directional antenna may have a wired connection with the respective module. By this, a well-defined data transmission and connection between the antenna and the respective module can be established.

Also, mechanical failures do not play a significant role in risk evaluation, as the distance between the module and the antenna is very short and thus, no big distances must be bridged with the wired communication line.

The information transmission system may comprise one or more built-in and/or integrated antennas. By integration of antennas a more compact design of the information transmission system may be established.

Furthermore, the present invention relates to a commercial vehicle. Accordingly, a commercial vehicle may comprise at least the information-sending module of the information transmission system as described above.

Also, the invention relates to a commercial vehicle combination. Accordingly, a commercial vehicle combination comprises at least one truck and at least two trailers, wherein the commercial vehicle combination comprises further an information transmission system as described above. The information-sending module may be arranged on the truck, the repeating module may be arranged on the first trailer and the receiving module may be arranged on the second trailer.

Furthermore, the present invention relates to an information sending module for an information transmission system. The information sending module comprises the features of the information sending module as described in this disclosure.

Moreover, the present invention relates to a repeating module for an information transmission system. The repeating module comprises the features of the repeating module as described in this disclosure.

Additionally, the present invention relates to a message receiving module for an information transmission system. The message receiving module comprises the features of the message receiving module as described in this disclosure.

Further details and advantages shall now be described in connection with the figures.

DETAILED DESCRIPTION OF THE DRAWINGS

Figure 1:
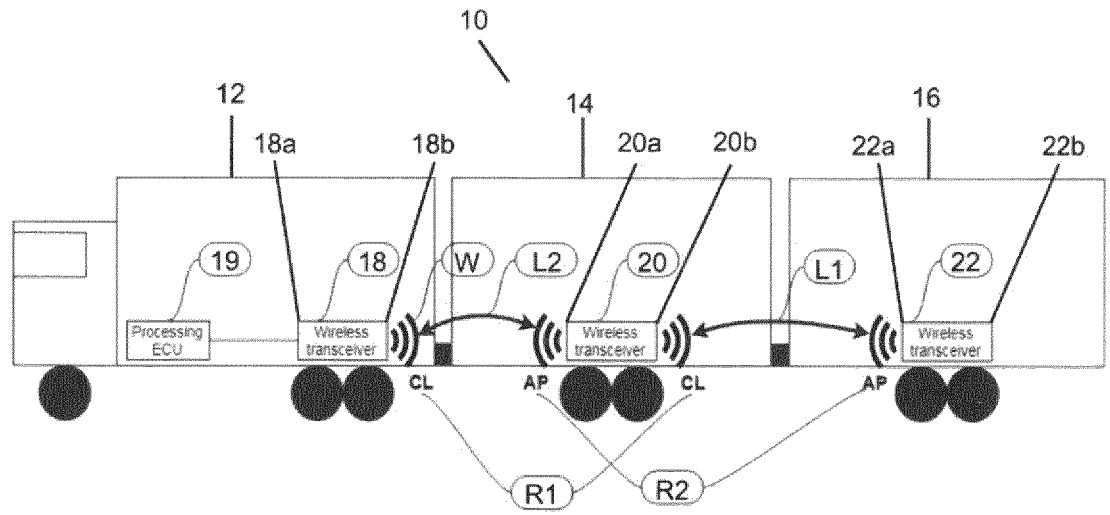
FIG. 1 illustrates the architecture of a tethered vehicle equipped with an information transmission system according to an embodiment of the present invention.

FIG. 1 shows an information transmission system 10 for at least one commercial vehicle.

Here, more commercial vehicles are present, i.e. one truck 12 as towing vehicle and two trailers 14, 16.

In the shown embodiment, the vehicles, i.e. the truck 12 and two trailers 14, 16, are tethered and form a so-called road-train.

All the vehicles, i.e. here the truck 12 as towing vehicle and being in the first position of the road-train, the first trailer 14 having the middle position of the road-train, and the second trailer 16 having the last position of the road-train, are each equipped with a wireless transceiver 18, 20, 22.

The wireless transceiver 18 is mounted on the truck 12, the wireless transceiver 20 is mounted on the first trailer 14 and the wireless transceiver 22 is mounted on the second trailer 16.

In the truck, there is also an electronic control unit (ECU) 19 provided.

All used transceivers within the system 10 are identical. This is also possible, when more vehicles are used and then each vehicle may be equipped with an identically made and specified transceiver.

Each wireless transceiver 18, 20, 22 is capable of transmitting and receiving wireless signals W.

The wireless transceivers 18, 20, 22 do not do the data processing itself, but forward the data to the processing ECU 19 via regular wired interface.

The signal transmission between information sending module, here represented by (at least) one of the wireless transceivers 18, 20, 22, and repeating module, here represented by (at least) one of the other wireless transceivers 18, 20, 22, is established so as to be wireless.

Also, the signal transmission between information repeating module, e.g. represented by the transceiver 20 on the first trailer 14, and the receiving module, here represented by the transceiver 22 on the second trailer 16, is wireless.

The signal transmission between the transceivers 18, 20, 22 can be a WiFi connection. It is also possible that another standard is chosen, e.g. a standard such as Bluetooth, WAVE, ETSI ITS-G5, IEEE 802.15.4, C-V2X or the like.

Furthermore, the information transmission system 10 comprises one or more directional antenna(s) 18a, 18b, 20a, 20b, 22a, 22b.

The antennas 18a, 18b, 20a, 20b, 22a, 22b are integrated into the transceivers 18, 20, 22. In the shown embodiment, each transceiver 18, 20, 22 has two integrated antennas 18a, 18b, 20a, 20b, 22a, 22b.

All antennas 18a, 18b, 20a, 20b, 22a, 22b have a gain of at least +5 dBi.

Moreover, all antennas 18a, 18b, 20a, 20b, 22a, 22b have a wired connection to the respective transceiver 18, 20, 22.

Figure 2:
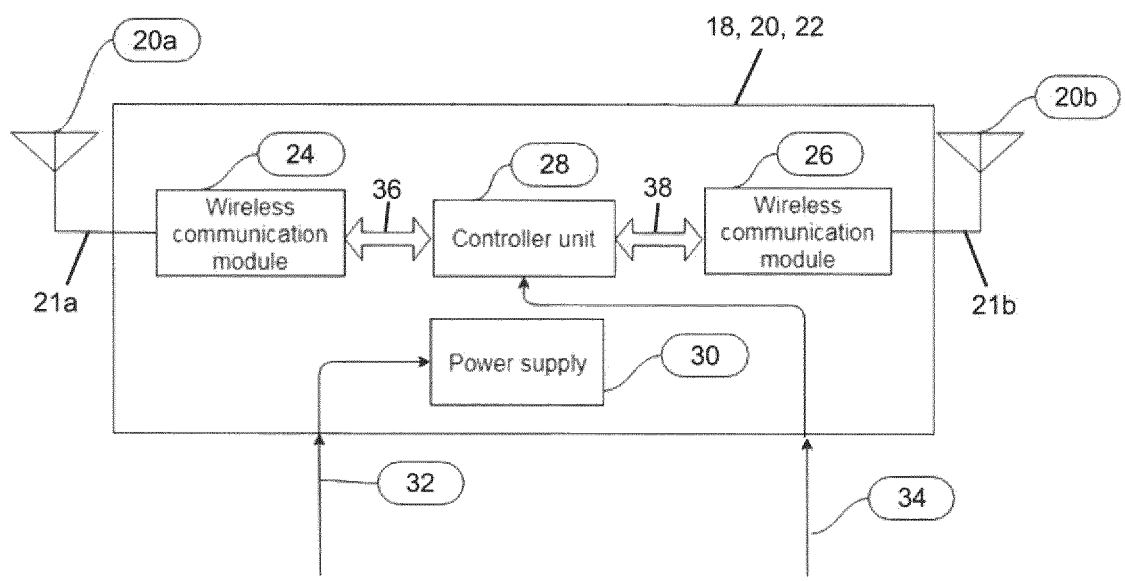
FIG. 2 is a block diagram of a transceiver (repeating module) according to the present invention.

FIG. 2 shows the block diagram of a transceiver 18, 20, 22 according to the present invention, here with the "middle" transceiver 20.

The transceiver 20 has an antenna 20a and an antenna 20b.

Furthermore, the transceiver 20 has a first wireless communication module 24, a second wireless communication module 26, a controller unit 28, a power supply 30, a wired connection 32 that carries the power voltage and a wired connection 34 that carries the signal of other sensors of the vehicle.

The antenna 20a is connected with a wired link 21a with the first wireless communication module 24.

The antenna 20b is connected with a wired link 21b with the second wireless communication module 26.

The controller unit 28 is connected via high speed communication links 36, 38 to the communication module 24, 26.

The functionality of the information transmission system 10 can be described as follows.

The information transmission system 10 comprises with the first transceiver 18 as information sending module, with the middle transceiver 20 as repeating module and with the endmost transceiver 22 as receiving module.

The first transceiver 18 sends signals defining a message to the middle transceiver 20 acting as repeating module, wherein the middle transceiver 20 enhances the signals and forwards the signals to the endmost transceiver 22 acting as receiving module.

When the endmost trailer 16 wants to send messages to the truck 12 (or vice versa), this does not happen directly.

Instead, the transceiver 22 of the endmost trailer 16 sends it to the middle transceiver 20 mounted on the trailer 14 in the middle via a wireless link L1.

The middle transceiver 20 mounted on the trailer 14 in the middle enhances the signals and then forwards the message to the first transceiver 18 mounted on the truck 12 via another wireless link L2. The two wireless links L1, L2 may operate on different channels or even use different wireless technologies.

In one embodiment the used wireless technology is compliant with the Wi-Fi standards. The backwards facing radios R1 are configured to behave as clients CL, while the forwards facing radios R2 are configured as access points AP. The access points AP may work on different channels and therefore they do not have to share the bandwidth of the channel.

Within the transceiver 20, the controller unit 28 plays a gateway role between the two wireless communication modules 24, 26 and its wired interface 34.

The controller unit 28 forwards the data from one wireless module 24 to the other wireless module 26 (or vice versa, as this is a bi-directional communication line) and sends the data of the sensor of the vehicle received via its wired interface 34 and wireless interfaces 24, 26.

REFERENCES

10 Information transmission system
12 Truck
14 Trailer
16 Trailer
19 Electronic control unit (ECU)
18 Information sending module
18a Directional antenna
18b Directional antenna
20 Repeating module
20a Directional antenna
20b Directional antenna
21a Wired link
21b Wired link
22 Receiving module
22a Directional antenna
22b Directional antenna
24 Wireless communication module
26 Wireless communication module
28 Controller unit
30 Power supply
32 Wired connection
34 Wired connection
36 Communication link
38 Communication link
AP Access Point
CL Client
L1 Wireless link
L2 Wireless link
R1 Facing Radio
R2 Facing Radio
W Signals

The invention claimed is:

1. An information transmission system for at least one commercial vehicle, comprising:
   at least one information sending module;
   at least one repeating module; and
   at least one receiving module, wherein
   the information sending module is configured and arranged to send signals defining a message to the repeating module,
   wherein the repeating module is configured and arranged to enhance the signals and forward the signals to the receiving module,
   wherein the information sending module is configured and arranged to be mounted on a truck and that the repeating module and the receiving module are not mounted on the truck,
   wherein the information transmission system further comprises a directional antenna with the gain of at least+5 bBi for each of the information sending module, the repeating module and the receiving module, and
   wherein each directional antenna has a wired link with a respective one of the information sending module, the repeating module and the receiving module.

2. The information transmission system according to claim 1, wherein
   the repeating module is a transceiver and/or part of a transceiver.

3. The information transmission system according to claim 2, wherein
   the information sending module is a transceiver and/or part of a transceiver.

4. The information transmission system according to claim 3, wherein
   the receiving module is a transceiver and/or part of a transceiver.

5. The information transmission system according to claim 1, wherein
   signal transmission between the information sending module and the repeating module is wireless.

6. The information transmission system according to claim 5, wherein
   signal transmission between the information repeating module and the receiving module is wireless.

7. The information transmission system according to claim 6, wherein
   signal transmission between the information sending module, the repeating module, and/or the receiving module is in conformity with at least one of the following standards: WiFi, Bluetooth, WAVE, ETSI ITS-G5, IEEE 802.15.4, or C-V2X.

8. The information transmission system according to claim 1, wherein
   the information transmission system comprises one or more built-in and/or integrated antennas.

9. A commercial vehicle comprising the information sending module of the information transmission system according to claim 1.

10. A commercial vehicle combination, comprising:
    at least one truck;
    at least two trailers, and
    an information transmission system according to claim 1, wherein the information sending module is arranged on the truck, the repeating module is arranged on the first trailer and the receiving module is arranged on the second trailer.

11. An information sending module for an information transmission system according to claim 1, wherein
the information sending module is configured and arranged to send signals defining a message to the repeating module.

12. A repeating module for an information transmission system according to claim 1, wherein
the repeating module is configured and arranged to enhance the signals and forward the signals to the receiving module.

13. A receiving module for an information transmission system according to claim 1, wherein
the receiving module is arranged and configured to receive forwarded, enhanced, signals from the repeating module.

\* \* \* \* \*